(12) United States Patent
Harvey

(10) Patent No.: US 6,925,717 B1
(45) Date of Patent: Aug. 9, 2005

(54) INDUSTRIAL SCISSORS

(75) Inventor: Duane Henry Harvey, Lancaster, PA (US)

(73) Assignee: Tech Cast, Inc, Myerstown, PA (US)

( * ) Notice: Subject to any disclaimer, the term of this patent is extended or adjusted under 35 U.S.C. 154(b) by 159 days.

(21) Appl. No.: 10/188,241

(22) Filed: Jul. 1, 2002

(51) Int. Cl.$^7$ ................................ B25F 1/00
(52) U.S. Cl. ............................ 30/131; 7/158
(58) Field of Search ............ 7/107, 158, 157; 30/131, 134, 135; 76/106.5

(56) References Cited

U.S. PATENT DOCUMENTS

| | | | | |
|---|---|---|---|---|
| 1,903,257 A | * | 3/1933 | Dahl | 30/230 |
| 4,420,884 A | * | 12/1983 | Hembling | 30/266 |
| 5,430,940 A | | 7/1995 | Lym | |
| 5,430,941 A | | 7/1995 | Lin | |
| 5,469,622 A | | 11/1995 | Gradoni | |
| 5,497,522 A | * | 3/1996 | Chen | 7/128 |
| 5,711,182 A | * | 1/1998 | Yang | 72/409.14 |
| D409,064 S | | 5/1999 | Olix et al. | |
| D409,465 S | | 5/1999 | Olix et al. | |
| D419,842 S | | 2/2000 | Olix et al. | |
| D421,375 S | | 3/2000 | Carlson et al. | |
| D431,436 S | | 10/2000 | Gstalder | |
| 6,385,851 B2 | | 5/2002 | Yeh | |

* cited by examiner

Primary Examiner—Douglas D Watts
(74) Attorney, Agent, or Firm—Young & Basile, PC

(57) ABSTRACT

The present invention is industrial scissors and a method of manufacturing and using same including first and second scissor halves, each half having a blade, a handle, and first and second major opposed surfaces. Each blade has a first edge that is relatively thick and blunt tapered to a second edge that is sharp to form a cutting edge. Serrations are formed in the cutting edge of the blade having larger radii between the pivot point and the midpoint of the blade and smaller serrations between the midpoint of the blade and the tip of the blade to provide a gripping surface for preventing an object being cut from sliding down the blade toward the tip of the blade while cutting the object. Wire strippers are positioned between the handle and the pivot point of the scissors. A deburring surface is made from a plurality of filing grooves spaced transversely along the blunt side of the blade.

39 Claims, 2 Drawing Sheets

INDUSTRIAL SCISSORS

BACKGROUND OF THE INVENTION

The present invention relates to industrial scissors that can be used to cut a variety of objects, deburr tubes, and strip insulation from a variety of wire sizes. In general, separate tools are used for cutting, deburring and stripping insulation from wires in industrial settings and in the home. There are a wide variety of scissors for cutting objects, deburring tools for filing and wire strippers for removing insulation from various wire types and sizes on the market today. A need has arisen for an improved three-in-one tool that is compact and easy to use.

SUMMARY OF THE INVENTION

The present invention provides for industrial scissors having first and second scissor halves with substantially identical dimensional features. The scissors have a unique method for gripping an object and preventing the object from sliding down a blade on one or both halves towards the tip while cutting the object. Serrations on a cutting edge of the blade having a larger radii and/or larger depth between the pivot point and the midpoint of the blade and serrations on the cutting edge of the blade having smaller radii and/or smaller depth between the midpoint and the tip of the blade respectively are used for gripping and cutting objects such as rounded items that tend to slide away from the cutting action. The scissors can be used to cut a wide variety of difficult to cut materials and objects, such as Kevlar® and garage door cables, etc. A plurality of filing grooves spaced transversely apart from each other along a blunt edge opposite of the sharp edge of the blade are used for deburring tubes and the like. A plurality of grooves having apertures and sharp cutting edges on the ends thereof are positioned between the pivot point and the handle of the scissors for use as wire strippers. The stripping grooves are designed with varying depths and radii so that insulation can be stripped from different gauge wires.

A method for manufacturing industrial scissors according to the present invention includes the steps of casting a scissor half from metal to form a rough shaped blade, handle, grooves on a blunt side of the blade, and wire stripper grooves between a pivot point and the handle with excess material to form a pad on the opposite side of the wire stripper grooves. The method includes grinding excess material from the blade and the wire stripping pad to form the sharp edge on the blade and to form apertures with sharp edges for stripping the insulation from wires of various gauge sizes. The method also includes forming serrations on the sharp edge of the blade of various radii and depths and forming grooves in the blunt side of the blade for deburring tubes and the like.

A method of use for industrial scissors is also disclosed using serrations in the blade to obtain a strong grip on an object to be cut so that the object will not slide down the blade away from the cutting edge of the blade as the blades are squeezed together.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
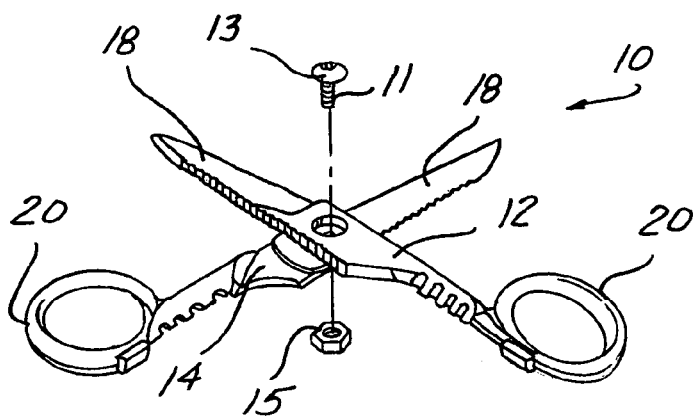
FIG. 1 is a perspective view of assembled industrial scissors.

A pair of industrial scissors 10 is illustrated in FIG. 1. The scissors 10 have nearly identical halves 12 and 14, each having a blade 18 and a handle 20. The only difference between scissor halves 12, 14 is that scissor half 12 has a round recess 16 on the surface of the blade 18 for allowing a screw 11 with a round head 13 to fit into the recess 16 such that the screw head 13 is substantially flush with the outer surface of the blade 18. The screw 11 holds the scissor halves 12, 14 together. Scissor half 14 has a hexagonal recess 17 on the outer surface of the blade 18 for allowing a hexagonal nut 15 to thread onto the screw 11 and to be substantially flush with the outer surface of the blade 18. The handles 20 can be finger loops or rings, similar in style to traditional scissors. The loops 20 can be identical for each scissor half 12, 14 so that the scissors 10 can be used by a right-handed or left-handed user.

Figure 2A:
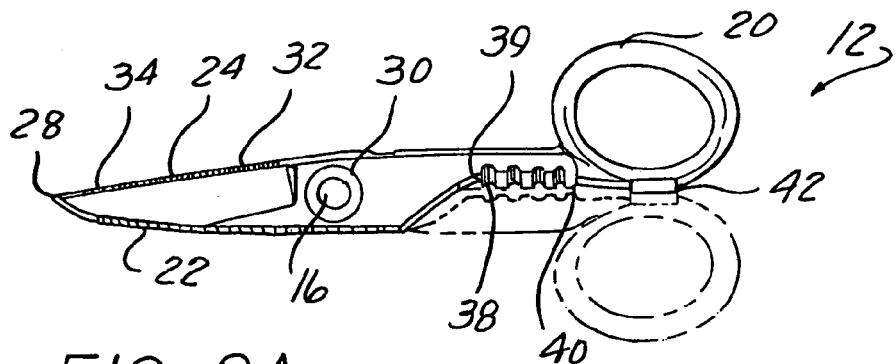
FIG. 2 is a side elevation view of a first half of the scissors of FIG. 1.
Figure 2B:
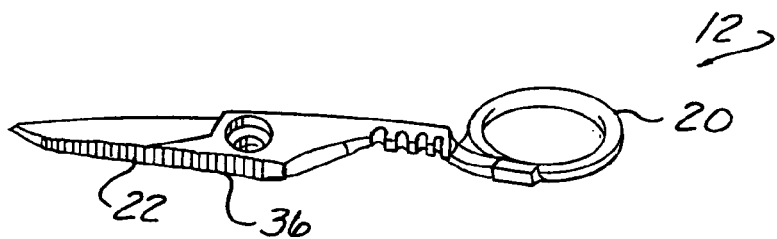
Figure 2C:
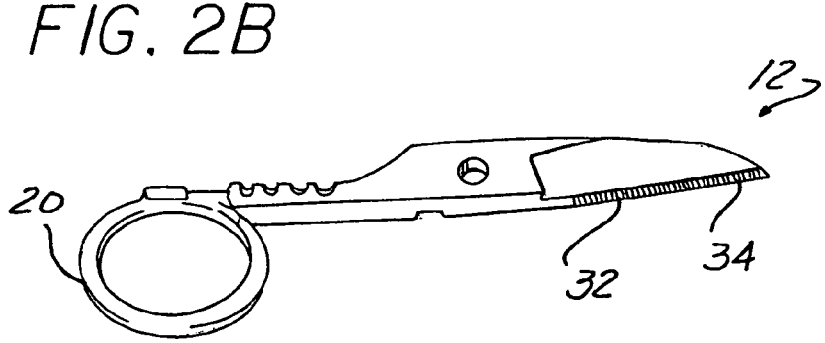

FIG. 2 shows a side elevation view of the first scissor half 12. The first scissor half 12 has a blade 18 with a relatively thick blunt edge 22 on a first edge tapered down to form a sharp cutting edge 24 on a second edge. The blade 18 has a midpoint 26 and a tip 28 at the end thereof. The scissor half 12 is pivotally connected at a pivot point 30 to the second half 14, positioned between the blade 18 and the handle 20, such that as the handles 20 of the scissor halves 12, 14 are drawn together, the blades 18 of the halves 12, 14 will slide past each other to produce a cutting action. At pivot point 30 of the scissor half 12, a through-bore in each scissor half 12, 14 allows the screw 11 to engage through each scissor half 12, 14 for holding the scissor halves 12, 14 together.

Figure 3A:
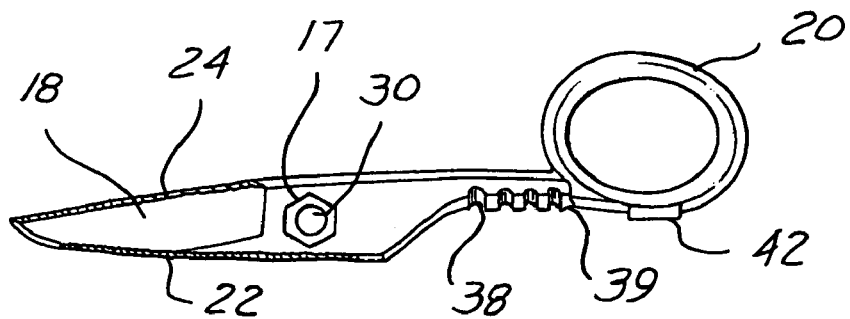
FIG. 3 is a side elevation view of a second half of the scissors of FIG. 1.
Figure 3B:
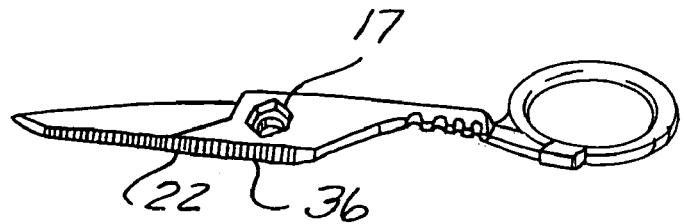
Figure 3C:
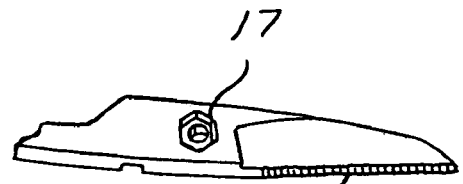

As shown in FIG. 3, the second scissor half 14 has substantially identical dimensional features to that of the first half 12 except that at pivot point 30, a hexagonal recess 17 is formed in the outside surface thereof for allowing a hexagonal nut 15 to fit therein for threadably engaging the screw 11 to pivotally hold the scissor halves 12, 14 together. The hexagonal recess 17 prevents the hexagonal nut 15 from rotating in a loosening direction.

Figure 4:
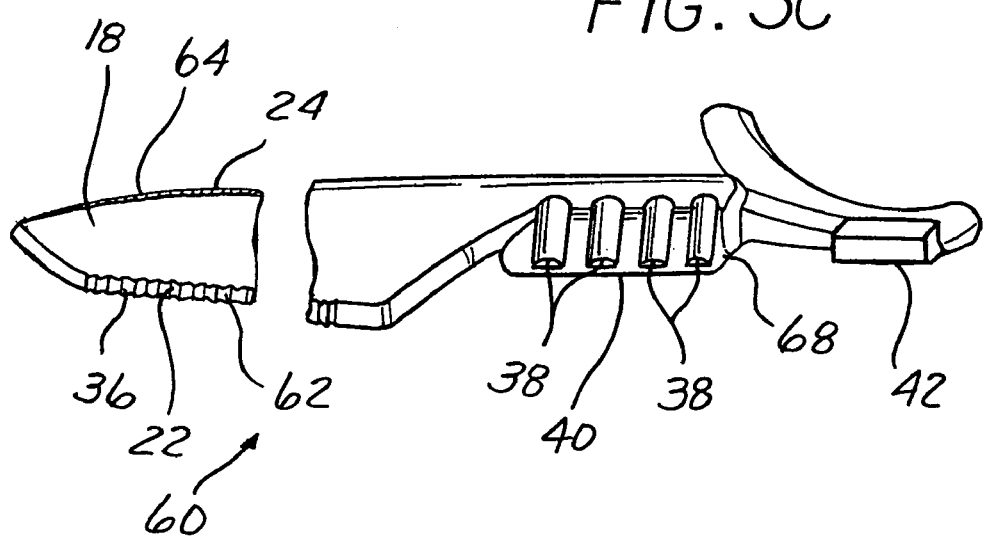
FIG. 4 is a perspective view of a scissors' casting.

FIG. 4 shows a perspective view of a scissor half casting 60. The casting 60 has additional material in areas to be finished by subsequent machining operations. Excess material 62 is cast onto one edge of the scissor half for allowing deburring grooves 36 to be machined into a blunt edge 22. Excess material 64 is cast onto the opposite edge for allowing a sharp edge 24 to be honed and subsequently forming serrations 32 and 34 in the blade 18 after the sharpening operation. A pad 39 with grooves 38 on one side and excess material 68 on the other side is cast into each scissor half 60 between the handle 20 and the pivot point 30. As the excess material 68 is ground down in a machining operation, apertures 40 having sharp edges are exposed on the ends thereof such that when two scissor halves are assembled, the grooves 38 on each half 12, 14 match up to form wire strippers.

Referring back to FIG. 2, means for gripping an object to prevent the object from sliding down the blades 18 toward the tips 28 of the blades 18 of the scissor halves 12, 14 while cutting the object is provided by forming large radii serrations 32 and small radii serrations 34 on the cutting edges 24 of both blades 18. The serrations 32 which have a large radii cut optionally at varying depths are located between the pivot point 30 and the midpoint 26 of scissors 10 and the small serrations 34 with smaller radii cut optionally at smaller depths are located between the midpoint 26 and the tip 28 of the scissors 10.

The scissors 10 have means for deburring tubes and the like. The means for deburring tubes is a plurality of filing grooves 36 spaced transversely apart along the blunt edge 22 of each blade 18.

The scissors 10 include means for stripping insulation from electrical cords or wires without cutting into the wire. The stripping means is a plurality of grooves 38 having apertures 40 with a sharp edge on the ends thereof. The stripping grooves 38 are positioned between the pivot point 30 and the handles 20 of the scissors 10. The stripping grooves 38 have variable radii and depths so that insulation can be cut from various gauge wires. The scissors 10 have means for restricting the wire strippers from traversing too far and cutting into a wire. This restricting means is a pad 42 attached to each handle 20 that acts as a stop when the handles 20 are squeezed together and make contact with each other.

The preferred material used to form the scissors 10 is stainless steel 440C. This material is used because it is oxidation resistant and can be used in surgical areas that require the use of an autoclave for cleaning and disinfecting the scissors 10.

A method for manufacturing industrial scissors 10 includes forming preferably by casting the scissors 10 from metal to form rough shaped blades 18, handles 20, grooves 36 on a first edge 22 of the blade 18 for use as a deburrer and wire stripper grooves 38 located between the pivot point 30 of the scissors 10 and the handle 20 with excess material to form a pad 42 on the opposite side of the wire stripper grooves 38. The method of manufacture further includes grinding excess material from the blades 18 and the wire stripping pad 39 preferably during one manufacturing operation to form a cutting or grinding edge 24 on the blades 18 and to form apertures 40 with sharp edges for stripping insulation from wires of various gauge sizes. The next step in the manufacturing process is to machine serrations 32 and 34 into the cutting edge 24 of the blades 18. These serrations 32, 34 are used to grip onto objects that tend to slide away from the blades 18, such as round articles, so that the scissors 10 can cut the objects. The serrations 32, 34 can be machined with various radii and depths in the blade. Larger serrations 32 are formed from approximately the pivot point 30 of the scissors 10 to the blade midpoint 26. Smaller serrations 34 are machined from approximately the blade midpoint 26 to the blade tip 28.

A method of use for industrial scissors includes using the serrations 32 and 34 on the blade 18 to obtain a strong grip on the object to be cut so that the object will not slide down the blades 18 and away from the cutting edge 24 as the blades 18 are squeezed together.

What is claimed is:

1. A method of manufacturing industrial scissors comprising the steps of:
    forming a scissor blank from metal to form a blade end, a handle end, and grooves on a blunt edge of the blade end;
    forming wire stripper grooves between a pivot point of the scissors and the handle end; and
    forming excess material for forming a pad on the opposite side of the wire stripper grooves.

2. The method of claim 1 further comprising the step of:
    removing excess material from the blade end and the wire stripping pad for forming a sharp edge on the blade and for forming apertures with sharp edges for stripping insulation from wires of various gauge sizes.

3. The method of claim 2 further comprising the step of:
    removing material from the wire stripper and the blade end pad simultaneously at one workstation.

4. The method of claim 1 further comprising the step of:
    forming serrations in a sharp edge of the blade end.

5. The method of claim 4, wherein the step of forming serrations further comprises the step of:
    forming serrations of varying radii and varying depths into the sharp edge of the blade end.

6. The method of claim 4, wherein the step of forming serrations further comprises the step of:
    forming larger radii serrations from approximately the pivot point of the scissors to a midpoint of the blade end.

7. The method of claim 4, wherein the step of forming serrations further comprises the step of:
    forming smaller radii serrations from approximately a midpoint of the scissors to the tip of the blade end.

8. The method of claim 1 further comprising the step of:
    forming deburring grooves in the blunt edge of the at least one blade end.

9. Industrial scissors manufactured according to the method of claim 1 comprising:
    first and second scissor halves pivotally connected, each first and second half having a blade end, a handle end, a blunt edge, a cutting edge on the blade end, and first and second major opposed surfaces, the first surfaces of each half facing away from the opposed half, and the second surfaces of each half facing adjacent to the other half when the first and second halves are joined together, the blade end being tapered from the blunt edge to a sharp edge forming the cutting edge, the blade having an aft end connected to the handle and a tip at the other end and a midpoint located between the aft and tip ends thereof, the first and second scissor halves connected at a pivot point between the blade end and the handle end such that as the handle ends are drawn together the blade ends will slide past each other to produce a cutting action; and
    means carried at the cutting edges for gripping and preventing an object from sliding down the blade toward the tip of the blade while the cutting edges of both halves cut the object.

10. The scissors of claim 9 further comprising:
    the first and second scissor halves having identical dimensional features except at the pivot point, the two halves fastened together with a screw and hexagonal nut.

11. The scissors of claim 10 further comprising:
    the first half of the scissors having a through-bore at the pivot point for a fastener to engage through, a round recess in the first surface thereof for allowing a round screw head to fit substantially flush with the first surface of the first half; and the second half of the scissors having a through-bore at the pivot point for a screw to engage through, a hexagonal recess in the first surface thereof allowing a hexagonal nut to fit flush with the first surface of the second half.

12. The scissors of claim 9, wherein the gripping means comprises:

serrations formed on the cutting edge of the blade having first radii between the pivot point and the midpoint of the blade end and second smaller radii disposed between the midpoint and the tip of the blade end.

13. The scissors of claim 9 further comprising:

means for deburring surfaces.

14. The scissors of claim 13, wherein the deburring means comprises:

at least one groove spaced transversely along the blunt edge of the blade end.

15. The scissors of claim 9 further comprising:

means for stripping insulation from wires positioned between the pivot point and the handle end of the first and second scissor halves.

16. The scissors of claim 15, wherein the stripping means comprises:

at least one groove having an aperture with a sharp cutting edge on the end thereof.

17. The scissors of claim 16, wherein a plurality of wire stripping grooves are comprised of varying radii.

18. The scissors of claim 9, wherein the first and second halves are formed of stainless steel 440C.

19. The scissors of claim 9, wherein the handle ends are finger loops.

20. The scissors of claim 19, wherein the finger loops on the handle ends are identically shaped on the first and second halves.

21. The scissors of claim 19 further comprising:

means for restricting the wire strippers from cutting into the wire.

22. The scissors of claim 21, wherein the restricting means comprises:

a pad attached to the handle ends on each scissor half, the pads engage each other to provide a stop when the handles are squeezed together.

23. Industrial scissors manufactured according to the method of claim 1 comprising:

first and second scissor halves pivotally connected, each half having a blade end, a handle end, a blunt edge and a cutting edge on the blade end, and first and second major opposed surfaces, the first surfaces of each half facing away from the opposed half, and the second surfaces of each half facing adjacent to the other half when the first and second halves are joined together, the blade end being tapered from the blunt edge to a sharp edge forming the cutting edge, the blade having an aft end connected to the handle and a tip at the other end and a midpoint located between the aft and tip ends thereof, the first and second scissor halves connected at a pivot point between the blade end and the handle end such that as the handle ends are drawn together the blade ends will slide past each other to produce a cutting action; and means for stripping insulation from wires positioned between the pivot point and the handle end of the first and second scissor halves.

24. The scissors of claim 23, wherein the stripping means comprises:

at least one groove having an aperture with a sharp cutting edge on the ends thereof.

25. Industrial scissors comprising:

first and second scissor halves pivotally connected, each half having a blade end, a handle end, a blunt edge and a cutting edge on the blade end, and first and second major opposed surfaces, the first surfaces of each half facing away from the opposed half, and the second surfaces of each half facing adjacent to the other half when the first and second halves are joined together, the blade end being tapered from the blunt edge to a sharp edge forming the cutting edge, the blade having an aft end connected to the handle and a tip at the other end and a midpoint located between the aft and tip ends thereof, the first and second scissor halves connected at a pivot point between the blade end and the handle end such that as the handle ends are drawn together the blade ends will slide past each other to produce a cutting action; and means carried at the cutting edges for gripping and preventing an object from sliding down the blade toward the tip of the blade while the cutting edges of both halves cut the object, the gripping and preventing means including serrations having different size radii.

26. The scissors of claim 25 further comprising:

the first and second scissor halves having substantially identical dimensional features, the two halves fastened together with a screw and hexagonal nut.

27. The scissors of claim 26 further comprising:

the first half of the scissors having a through-bore at the pivot point for a fastener to engage through, a round recess in the first surface thereof for allowing a round screw head to fit substantially flush with the first surface of the first half; and the second half of the scissors having a through-bore at the pivot point for a screw to engage through, a hexagonal recess in the first surface thereof allowing a hexagonal nut to fit flush with the first surface of the second half.

28. The scissors of claim 25, wherein the gripping means comprises:

the serrations formed on the cutting edge of the blade having first radii between the pivot point and the midpoint of the blade end and second smaller radii disposed between the midpoint and the tip of the blade end.

29. The scissors of claim 25 further comprising:

means for deburring surfaces, the deburring means including at least one groove spaced transversely along the blunt edge of the blade end of each half.

30. The scissors of claim 25 further comprising:

means for stripping insulation from wires positioned between the pivot point and the handle end of the first and second scissor halves.

31. The scissors of claim 30, wherein the stripping means comprises:

at least one groove having an aperture with a sharp cutting edge on the end thereof.

32. The scissors of claim 31, wherein a plurality of wire stripping grooves are comprised of varying radii.

33. The scissors of claim 25, wherein the first and second halves are formed of stainless steel 440C.

34. The scissors of claim 25, wherein the handle ends are finger loops.

35. The scissors of claim 34, wherein the finger loops on the handle ends are identically shaped on the first and second halves.

36. The scissors of claim 25 further comprising:
   means for restricting the wire strippers from cutting into the wire.

37. The scissors of claim 36, wherein the restricting means comprises:
   a pad attached to the handle ends on each scissor half, the pads engage each other to provide a stop when the handles are squeezed together.

38. Industrial scissors comprising:
   first and second scissor halves pivotally connected, each half having a blade end, a handle end, a blunt edge and a cutting edge on the blade end, and first and second major opposed surfaces, the first surfaces of each half facing away from the opposed half, and the second surfaces of each half facing adjacent to the other half when the first and second halves are joined together, the blade end being tapered from the blunt edge to a sharp edge forming the cutting edge, the blade having an aft end connected to the handle and a tip at the other end and a midpoint located between the aft and tip ends thereof, the first and second scissor halves connected at a pivot point between the blade end and the handle end such that as the handle ends are drawn together the blade ends will slide past each other to produce a cutting action; and means carried at the cutting edges for gripping and preventing an object from sliding down the blade toward the tip of the blade while the cutting edges of both halves cut the object, the gripping and preventing means including serrations having different size radii; and means for stripping insulation from wires positioned between the pivot point and the handle end of the first and second scissor halves.

39. The scissors of claim 38, wherein the stripping means comprises:
   at least one groove having an aperture with a sharp cutting edge on the end thereof.

* * * * *